United States Patent [19]
Arvidsson et al.

[11] Patent Number: 5,402,925
[45] Date of Patent: Apr. 4, 1995

[54] LOAD CARRIER

[75] Inventors: Jan-Ivar Arvidsson, Tranbärsstigen; Claes-Göran Lindén, Humlevagen, both of Sweden

[73] Assignee: Industri AB Thule, Hillerstorp, Sweden

[21] Appl. No.: 79,606

[22] Filed: Jun. 22, 1993

[30] Foreign Application Priority Data

Jun. 24, 1992 [SE] Sweden .................. 9201937

[51] Int. Cl.6 .................. A45F 3/00
[52] U.S. Cl. .................. 224/316; 224/309; 224/324
[58] Field of Search ............ 224/309, 315, 316, 317, 224/318, 322, 324, 325, 326, 327, 328

[56] References Cited

U.S. PATENT DOCUMENTS

| | | | |
|---|---|---|---|
| 4,261,496 | 4/1981 | Mareydt et al. | 224/315 |
| 4,279,368 | 7/1981 | Kowalski | 224/309 X |
| 5,025,967 | 6/1991 | Cronce et al. | 224/309 X |

FOREIGN PATENT DOCUMENTS

| | | | |
|---|---|---|---|
| 1430612 | 5/1969 | Germany | 224/324 |
| 3814799 | 11/1988 | Germany . | |
| 3814800 | 11/1988 | Germany . | |
| WO91/08929 | 6/1991 | WIPO . | |

Primary Examiner—Henry J. Recla
Assistant Examiner—David J. Walczak
Attorney, Agent, or Firm—Burns, Doane, Swecker & Mathis

[57] ABSTRACT

A load carrier for vehicles has two longitudinal carrier profiles (4) fixed on the roof of the vehicle, the carrier profiles being of cross sections which are open in a direction towards one another and which are curved so as to be adapted to the curvature of the vehicle roof. The carrier profiles (4) are provided with covering profiles (5) on their open sides, these profiles being curved in a manner corresponding to that of the carrier profiles (4). The covering profiles (5) may be opened by pivoting by means of elastic and/or resiliently yieldable connecting devices (10) which, with short lengths, are distributed along the length of the carrier profiles. The carrier profiles (4) and the covering profiles (5) are provided, along their edges facing away from the connecting devices (10), with snap fasteners (7, 9) for fixedly retaining the covering strips in the closed position.

21 Claims, 2 Drawing Sheets

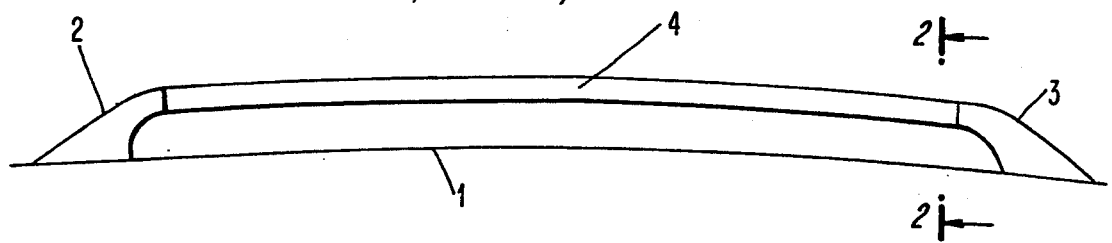

LOAD CARRIER

TECHNICAL FIELD

The present invention relates to a load carrier for vehicles comprising two carrier profiles secured longitudinally on the vehicle roof via feet, the profiles being of open cross section in one direction and being curved so as to adapt to the roof contour of the vehicle.

BACKGROUND ART

Load carriers of the above-mentioned type are previously known in a plurality of different variations and, as a rule, have carrier profiles designed as closed profiles which serve for fixedly mounting and carrying transverse load carrier struts. The carrier profiles may hereby simply be given attractive appearance and superior aerodynamic properties. However, the concept suffers from drawbacks in that load carrier struts, when not in use, must be stored within the vehicle or elsewhere, for which reason there is always a risk that the load carrier struts are not to hand when needed.

Load carriers of the type mentioned by way of introduction are also previously known in the art in which the transverse load carrier struts are pivotally secured in the longitudinal load carriers so that they, when not in use, extend along the longitudinal load carriers and are possibly recessed wholly or partly therein. In such an embodiment, the longitudinal load carriers are of open cross section, the openings being turned to face in towards the centre line of the vehicle.

A design of this type may give rise to turbulence and road noise, since it presents no smooth outer surface. In addition, there is also the risk that penetrating dirt and water may impair or even destroy the function of moving parts included in the construction. Moreover, it is desirable for aesthetic reasons to be able to design the longitudinal load carriers with closed profiles or to fit them with masking or covering profiles. However, this latter solution entails problems because of the curvature of the load carrier.

PROBLEM STRUCTURE

The present invention has for its object to design the load carrier intimated by way of introduction such that this, despite its arching to follow the roof contour, may be provided with a covering or masking profile which encloses the transverse struts and their mechanisms when not in use. The invention further has for its object to devise a load carrier in which the covering profiles are secure on the carrier profiles even when they are open. Furthermore, the invention has for its object to realise a load carrier which is aesthetically attractive, which has a smooth outer surface and which is both simple and economical to manufacture.

SOLUTION

The objects forming the basis of the present invention will be attained if the load carrier intimated by way of introduction is characterized in that the carrier profiles are, along their open sides, closable by means of covering profiles which have a curvature corresponding to that of the carrier profiles and which are pivotally connected to the carrier profiles by the intermediary of elastic and/or resiliently yieldable connecting devices.

As a result of these characterizing features, the covering profile may be pivoted about an axis which is parallel with the approximate longitudinal axis of the carrier profile even though the carrier profile and the covering profile are curved.

According to one preferred embodiment, it also suitably applies that the carrier profiles and the covering profiles are provided, along their mutually facing edge portions, with snap catches for fixedly retaining the covering profiles in the closed position.

These particular features make for a durable interconnection between the profiles which eliminates the risk of rattle and which may even increase the payload of the carrier. Further advantages will be attained according to the present invention if this is given one or more of the characterizing features as set forth below.

BRIEF DESCRIPTION OF THE ACCOMPANYING DRAWING

The present invention will now be described in greater detail hereinbelow, with particular reference to the accompanying Drawing. In the accompanying Drawing:

FIG. 1 is a side elevation of a load carrier which is intended to be placed in the longitudinal direction of a vehicle along the roof edge thereof;

FIG. 2 is a section taken through the load carrier along the section marking A—A in FIG. 1;

DESCRIPTION OF PREFERRED EMBODIMENT

Figure 3:
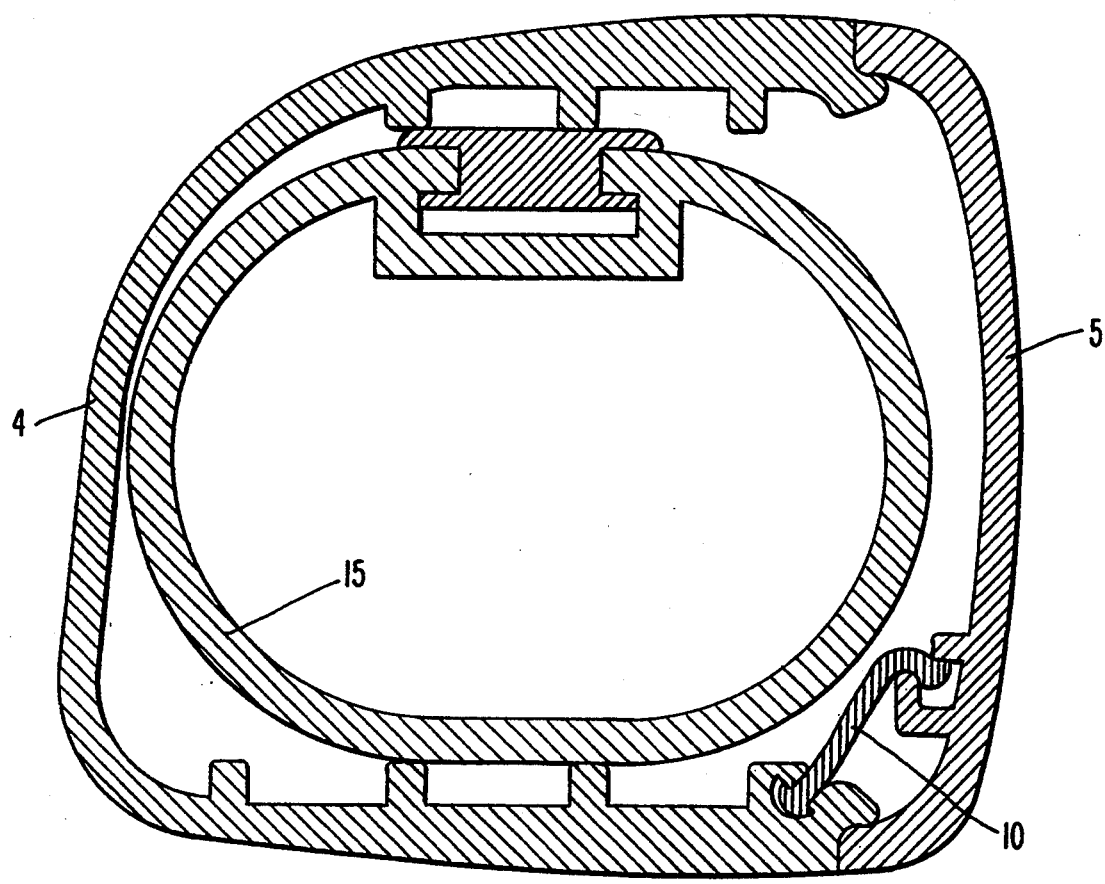
FIG. 3 is a view of the section of FIG. 2 illustrating a strut stored in the space in the load carrier.

In FIG. 1, reference numeral 1 relates to the contour line of a vehicle roof and it will be apparent that this contour line is arched. There are disposed, on the vehicle roof, two feet 2 and 3 which, at their upper ends, support a carrier profile 4. It will be apparent from the Drawing that the carrier profile 4 is arched in a manner corresponding to the arching of the vehicle roof 1 so that an aesthetically pleasing construction is achieved.

Load carriers of the above-described type are generally placed in the longitudinal direction of the vehicle and along opposing side edge portions of the vehicle roof. However, in certain situations it is conceivable that the carrier profile instead runs transversely of the longitudinal direction of the vehicle and, thus, extends across the vehicle roof.

In its most generic form, the present invention entails that the arched carrier profile 4 is of open cross section and that the space interiorly in the carrier profile is employed as a storage space. In order for this to be possible with anything like advantageous effect, the carrier profile is closable by means of a masking or covering profile which is also arched in a manner corresponding to the carrier profile. In the embodiment with longitudinal railings, the covering profile is suitably placed on the inside of the railing so that the open sides of the carrier profiles are turned to face towards one another. However, constructions are also conceivable in which the carrier profile is open upwardly or possibly downwards and, thus, the covering profile is located on the upper side or lower side of the carrier profile.

Irrespective of how the carrier profile 4 is oriented with its open side, both the carrier profile and the covering profile have mutually interconnecting elastic or resiliently yieldable connecting devices which can take up the complex movement pattern which occurs on pivoting of the covering profile along an axis which is parallel to the approximate or mean longitudinal direction of the carrier profile. These connecting devices are suitably placed at the ends of the carrier profile, since the requirement on deformation capability in the connecting devices is least at this point.

FIG. 2 shows a cross section taken along the section marking A—A and it will be apparent that the carrier profile 4 is of approximately U-shaped cross section with its opening turned to face to the right in the Figure. The covering profile 5 has a gently arched configuration which follows the outer configuration of the carrier profile so that the two profiles, in the combined state, form a tubular profile with an exterior, gently arched contour. The space 6 interiorly in the two profiles is intended as a storage space, principally for such transverse struts 25 as may be pivoted out from the longitudinal carrier profile in order to be connected to the opposing carrier profile and hereby serve as a load carrier, as illustrated in FIG. 3.

Along its edges at the open side, the carrier profile 4 has outwardly facing, gently undercut longitudinal recesses 7 which are formed by longitudinal strips 8. Along their inner edges, the edge profiles 5 have correspondingly shaped, bead-like edge portions 9 which may be accommodated in the longitudinal recess 7 of the carrier profile. The degree of engagement of the bead-like edge portions 9 in the longitudinal recesses 7 must be adapted in dependence upon the yieldability in the two profiles so that the covering profile 5 may be snapped onto the carrier profile 4 and be reliably fixedly seated thereon.

On opening of the composite profile 4 and 5, i.e. when the covering profile 5 is to be removed, it is essential that this profile has no possibility of dropping off, but that it remains fixedly connected in the carrier profile. Opening of the covering profile 5 is realised by a pivoting in accordance with the arrow B in which the pivot axis lies at the lower bead-like edge portion 9 and in which the pivot axis approximately coincides with a chord of the arc which the lower, inner edge of the carrier profile 4 describes. Such a chord is approximately parallel with the average or mean longitudinal direction of the carrier profile.

According to the invention, the carrier profile 4 and the covering profile 5 are interconnected by the intermediary of elastic and/or resiliently yieldable connecting devices 10. These connecting devices are strip-shaped and each has, in the opposing edge, thickened, bead-like edge portions 11 which are accommodated in correspondingly shaped undercut grooves or accommodation spaces 12 and 13 at the lower, inner edge of the carrier profile 4 and a slight distance above the lower bead-like edge portion 9 of the covering profile 5. The connecting devices may be produced from elastic or resiliently yieldable plastics or rubber and be of superior flexibility so that they act as hinge means at the same time.

The accommodation spaces for the bead-like edge portions 11 of the connecting devices 10 have been given reference numeral 12 on the carrier profile 4, while that on the covering profile 5 has been given reference numeral 13.

The fact that the accommodation space 13 of the covering profile 5 is placed a distance above the lower bead-like edge portion 9 also entails that the connecting device 10 will be stretched to a certain maximum length when the covering profile 5 is partially pivoted towards open position and will subsequently once again be contracted when the covering profile is pivoted to the fully opened state. This entails that, in the open state, the covering profile will be retained in position, in the same way as, in but slightly opened covering profile, it will be drawn towards closed position.

The length of the connecting devices 10 in the longitudinal direction of the profiles 4 and 5 may amount to between two and four times the transverse dimension of the profiles, and the placing of the connecting devices is, at least in the event of larger curvatures of the profiles, at the ends of the profiles. In the case of profiles of lesser curvature, additional connecting devices are possibly conceivable and even such as are placed in the central region of the profiles.

DESCRIPTION OF ALTERNATIVE EMBODIMENTS

According to the invention, it is of course also possible to place the connecting devices 10 at the upper edge of the two profiles 4 and 5 so that thereby the covering profile 5 is pivoted in an upward direction. In such an alternative, the connecting devices should, because of the direction of curvature of the two profiles, be placed in the central region of the profiles and not at their ends.

It should be emphasized that the design of the connecting devices 10 and their anchorage in the profiles 4 and 5 may be made in different ways and, for example, instead of elastic connecting devices of plastics or rubber, use might just as well be made of such devices of metal, for instance in the form of helical springs or the like. Curved leaf springs may also be employed.

Further modifications of the present invention may be made without departing from the spirit and scope of the appended claims.

What is claimed is:

1. A load carrier for vehicles, comprising:
 two longitudinal carrier profiles adapted to be connected to and extend between feet securable on a vehicle roof the carrier profiles having an elongated open side in one direction and being curved so as to be adapted to a contour of the vehicle roof;
 each of the carrier profiles having on the open side, a covering profile which has a curvature corresponding to that of the carrier profiles and which is pivotally connected to the carrier profile by resiliently yieldable connecting devices formed of elastic.

2. The load carrier as claimed in claim 1, wherein the open sides of the carrier profiles are turned to face one another, and an interior of the carrier profiles is designed for accommodating struts which are pivotal between a position accommodated in the carrier profile and a position outwardly pivoted and extended between and interconnecting the carrier profiles with one another.

3. The load carrier as claimed in claim 2, wherein the connecting devices are of considerably lesser length than the covering profiles and are disposed at end portions thereof.

4. The load carrier as claimed in claim 3, wherein the connecting devices are strip-shaped and have thickened, bead-like edge portions along opposing edges, the edge portions being accommodated in undercut grooves interiorly in the carrier profile and the covering profile.

5. The load carrier as claimed in claim 2, wherein the carrier profiles and the covering profiles are provided, along their mutually facing edge portions, with snap fasteners for fixedly retaining the covering profiles in a closed position.

6. The load carrier as claimed in claim 2, wherein the connecting devices are of considerably lesser length than the covering profiles and are disposed at end portions thereof.

7. The load carrier as claimed in claim 1, wherein the carrier profiles and the covering profiles are provided, along their mutually facing edge portions, with snap fasteners for fixedly retaining the covering profiles in a closed position.

8. The load carrier as claimed in claim 1, wherein the connecting devices are strip-shaped and have thickened, bead-like edge portions along opposing edges, the edge portions being accommodated in undercut grooves interiorly in the carrier profile and the covering profile.

9. The load carrier as claimed in claim 1, wherein the covering profiles are pivotable between a closed and an open position and wherein the covering devices are retained in their open and closed positions by the resiliently yieldable devices.

10. A load carrier for vehicles, comprising:
two longitudinal carrier profiles adapted to be connected to and extend between feet securable on a vehicle roof, the carrier profiles having an elongated open side in one direction and being curved so as to be adapted to a contour of the vehicle roof;
each of the carrier profiles having on the open side a covering profile which has a curvature corresponding to that of the carrier profiles and which is pivotally connected to the carrier profile by resiliently yieldable connecting devices, wherein the covering profiles are pivotable between a closed and an open position and wherein the covering profiles are retained in their open and closed positions by the resiliently yieldable connecting devices.

11. The load carrier as claimed in claim 10, wherein the open sides of the carrier profiles are turned to face on another, and an interior of the carrier profiles is designed for accommodating struts which are pivotal between a position accommodated in the carrier profile and a position outwardly pivoted and extended between and interconnecting the carrier profiles with one another.

12. The load carrier as claimed in claim 10, wherein the connecting devices are elastic.

13. The load carrier as claimed in claim 10, wherein the carrier profiles and the covering profiles are provided, along their mutually facing edge portions, with snap fasteners for fixedly retaining the covering profiles in a closed position.

14. The load carrier as claimed in claim 10, wherein the connecting devices are of considerably lesser length than the covering profiles and are disposed at end portions thereof.

15. The load carrier as claimed in claim 10, wherein the connecting devices are strip-shaped and have thickened, bead-like edge portions along opposing edges, the edge portions being accommodated in undercut grooves interiorly in the carrier profile and the covering profile.

16. A load carrier for vehicles, comprising:
two longitudinal carrier profiles adapted to be connected to extend between feet securable on a vehicle roof, the carrier profiles having an elongated open side in one direction and being curved so as to be adapted to a contour of the vehicle roof;
each of the carrier profiles having on the open side a covering profile which has a curvature corresponding to that of the carrier profiles and which is pivotally connected to the carrier profile by resiliently yieldable connecting devices, the connecting devices being stripshaped and having thickened, bead-like edge portions along opposing edges, the edge portions being accommodated in undercut grooves interiorly in the carrier profile and the covering profile.

17. The load carrier as claimed in claim 16, wherein the open sides of the carrier profiles are turned to face on another, and an interior of the carrier profiles is designed for accommodating struts which are pivotal between a position accommodated in the carrier profile and a position outwardly pivoted and extended between and interconnecting the carrier profiles with one another.

18. The load carrier as claimed in claim 16, wherein the connecting devices are elastic.

19. The load carrier as claimed in claim 16, wherein the carrier profiles and the covering profiles are provided, along their mutually facing edge portions, with snap fasteners for fixedly retaining the covering profiles in a closed position.

20. The load carrier as claimed in claim 16, wherein the connecting devices are of considerably lesser length than the covering profiles and are disposed at end portions thereof.

21. The load carrier as claimed in claim 16, wherein the covering profiles are pivotable between a closed and an open position and wherein the covering devices are retained in their open and closed positions by the resiliently yieldable devices.

* * * * *